United States Patent [19]
Holmberg

[11] Patent Number: 5,838,816
[45] Date of Patent: Nov. 17, 1998

[54] PATTERN RECOGNITION SYSTEM PROVIDING AUTOMATED TECHNIQUES FOR TRAINING CLASSIFIERS FOR NON STATIONARY ELEMENTS

[75] Inventor: Bart A. Holmberg, Bellevue, Wash.

[73] Assignee: Hughes Electronics, Los Angeles, Calif.

[21] Appl. No.: 598,128

[22] Filed: Feb. 7, 1996

Related U.S. Application Data

[63] Continuation of Ser. No. 229,846, Apr. 18, 1994, abandoned, which is a continuation of Ser. No. 993,171, Dec. 18, 1992, abandoned.

[51] Int. Cl.[6] .................................................. G06K 9/66
[52] U.S. Cl. .......................... 382/157; 382/225; 367/131
[58] Field of Search .................... 382/103, 224, 382/225, 227, 228, 156, 157, 159; 367/87, 131; 395/21, 23

[56] References Cited

U.S. PATENT DOCUMENTS

| | | | |
|---|---|---|---|
| 4,686,655 | 8/1987 | Hyatt .................................. | 364/724.01 |
| 4,773,099 | 9/1988 | Bokser .................................... | 382/225 |
| 5,040,133 | 8/1991 | Feintuch et al. ......................... | 382/225 |
| 5,181,254 | 1/1993 | Schweizer et al. ...................... | 382/100 |
| 5,214,744 | 5/1993 | Schweizer et al. ...................... | 382/103 |
| 5,220,618 | 6/1993 | Sirat et al. .............................. | 382/157 |
| 5,359,699 | 10/1994 | Tong et al. ............................... | 382/159 |

OTHER PUBLICATIONS

Cooper. "The Hypersphere in Pattern Recognition." Information and Control, 5, pp. 324–346, 1962.

Lippmann. "Patter Classification Using Neural Networks" IEEE Communications Magazine, vol. 27, No. 11, pp. 47–64, Nov. 1989.

Hudak. "RCE Networks: An Experimental Investigation" IJCNN–91–Seattle, vol. 1, pp. 849–854, Jul. 1991.

Cottle et al. "All Neural Network Sonar Discrimination System" IEEE Conf. on Neural Net for Ocean Eng. pp. 13–19, Aug. 1991.

Gorman. "Neural Networks and the Classification of Complex Sonar Signals" IEEE Conf. on Neural Not for Ocean Eng. pp. 283–290, Aug. 1991.

*Primary Examiner*—Joseph Mancuso
*Assistant Examiner*—Jon Chang
*Attorney, Agent, or Firm*—G. S. Grunebach; M. W. Sales; W. K. Denson-Low

[57] ABSTRACT

An improved pattern recognition system. The invention operates on a plurality of feature vectors from a single class of data samples. The inventive system estimates a pruning radius for the feature vectors in the single class of data samples and generates a replacement class therefrom based on the estimated pruning radius. This pruning radius is used to train a classifier which in turn facilitates the recognition of a data pattern in raw data. In a specific implementation, the pruning radius is adapted based on current results from the classifier. The invention satisfies the need in the art by providing an automated technique for training classifiers for nonstationary data classes which is not limited by the need for more than one class of data.

6 Claims, 9 Drawing Sheets

TWO DIMENSIONAL FEATURE SPACE

PATTERN RECOGNITION SYSTEM PROVIDING AUTOMATED TECHNIQUES FOR TRAINING CLASSIFIERS FOR NON STATIONARY ELEMENTS

This is a continuation of application Ser. No. 08/229,846, filed Apr. 18, 1994 now abandoned, which is a continuation of application Ser. No. 07/993,171, filed Dec. 18, 1992, now abandoned.

BACKGROUND OF THE INVENTION

1. Field of the Invention

The present invention relates to pattern recognition systems. More specifically, the present invention relates to techniques for building classifiers for pattern recognition systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In many applications, there is a need for a capability to recognize patterns in samples of data. In long range sonar applications, for example, there is a need to recognize targets in a background of clutter. As pattern recognition is difficult to achieve with conventional sequential processors, neural network (net) processors are typically employed for this application. Artificial neural networks utilize an array of relatively simple processors in a parallel fashion much like the brain. The processors with associated nonlinearities and interconnection weights provide a classifier which can implement a classification algorithm. The classifier determines which class of data a sample of data was most likely to have come from. For this purpose, the classifier must be trained. Training involves the application of known data, to an algorithm which modifies the classifier weights.

For many applications, classifier training is critical and expensive. In the long range active sonar application, for example, classifier training typically involves the use of the tracking of a known target, e.g., a submarine, which transmits position to the tracking system. This target position information is used to process the data received from the sonar receiver and thereby extract features representative of the clutter. These extracted features are used to train the classifier. The adaptation or training of the classifier requires an operator to overlay a representation of the target on a displayed received image and manually classify data samples as having come from the target class or the clutter class. With thousands of data points for a single frame of data, this process is typically time intensive and quite expensive. In any event, data thus obtained is then used to train classifiers in the sonar data processing systems of numerous other submarines or other towed array systems in the fleet.

While this expensive technique may be adequate in applications where the statistics of the unknown class are stationary, it is severely limited, if not ineffective, where the statistics are extremely dynamic such as in long range sonar applications.

Hence, the conventional approach to the training of classifiers for pattern recognition systems is limited by the need for statistics on both a known class and an unknown class and the need for a stationary statistical model of the data for the unknown class.

Thus, there is a need in the art for an automated technique for building classifiers for nonstationary data classes. There is a further need in the art for a classifier training technique which is not limited by the need for more than one class of data.

SUMMARY OF THE INVENTION

The need in the art is addressed by the present invention which provides an improved pattern recognition system. The invention operates on a plurality of feature vectors from a single class of data samples. The inventive system estimates a pruning radius for the feature vectors in the single class of data samples and generates a replacement class therefrom based on the estimated pruning radius. This pruning radius is used to train a classifier which in turn facilitates the recognition of a data pattern in raw data. The pruning radius is adapted based on current results from the classifier.

The invention satisfies the need in the art by providing an automated technique for training classifiers for nonstationary environments which is not limited by the need for more than two classes of data.

DESCRIPTION OF THE INVENTION

Illustrative embodiments and exemplary applications will now be described with reference to the accompanying drawings to disclose the advantageous teachings of the present invention.

The conventional long range sonar system requires use of a pattern recognition system to discriminate target data from background data. Pattern recognition is facilitated by a classifier which separates the data according to predetermined features along a boundary. For this purpose, the classifier must first be trained. The conventional classifier training technique involves the receipt of data from an unknown class (background) and the receipt of data from a known class (target data). Conventionally, data from the known class is generated by the transmission of position data from a known target to the tracking system while simultaneously receiving data on the unknown class. In a long range active sonar application, for example, this would involve the use of two submarines with one tracking the other.

Figure 1:
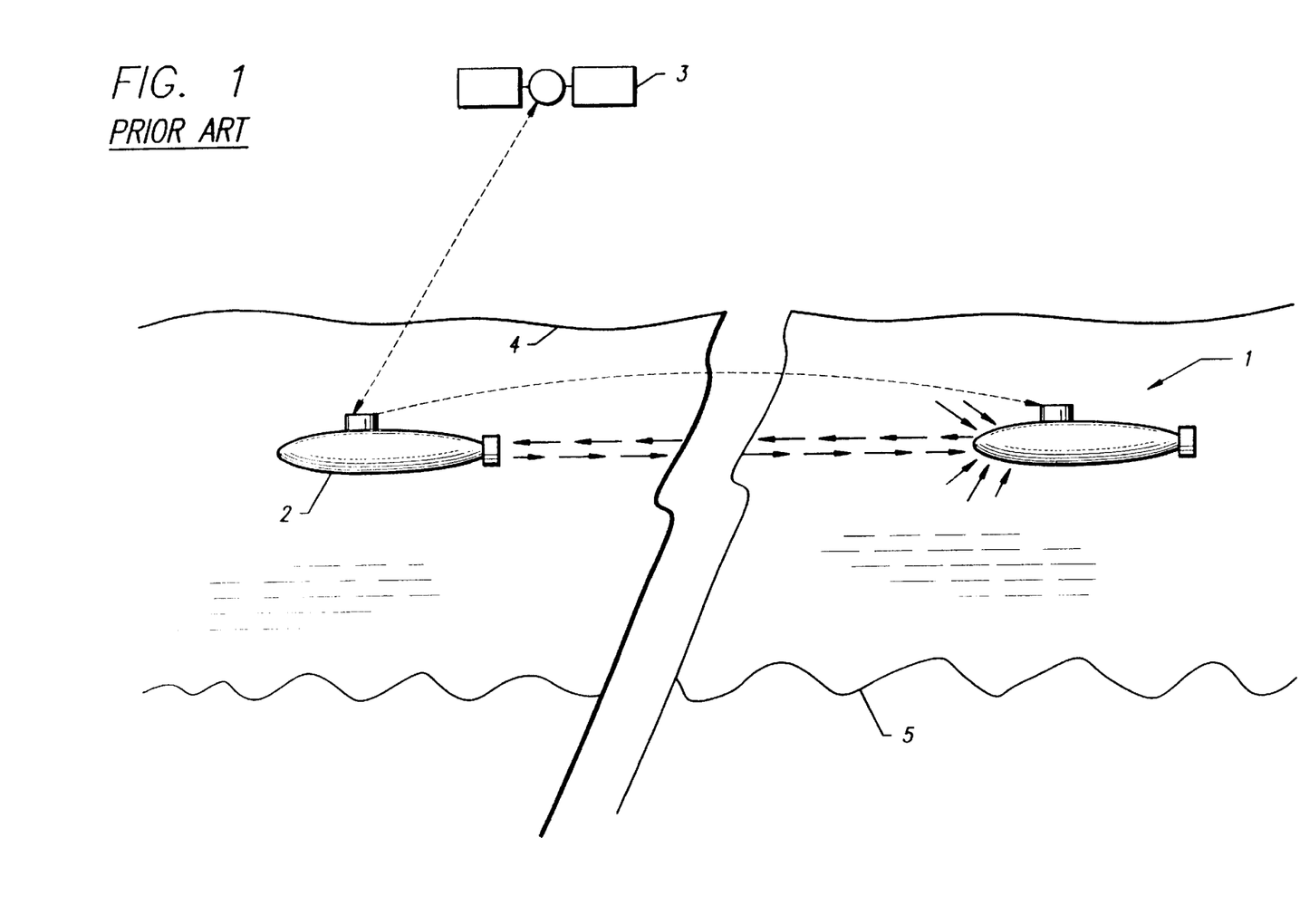
FIG. 1 is a diagram showing two submarines engaging in a conventional classifier training exercise.

FIG. 1 is a diagram showing two submarines engaging in a conventional classifier training exercise. The tracking submarine 1 emits a sonar signal which is reflected back to the tracking submarine by the tracked submarine 2. The tracked submarine 2 acquires its position from a Global Positioning System (GPS) satellite 3, for example, and transmits its position to the tracking submarine 1 directly or via a relay link not shown. The tracking submarine 1 receives the sonar return along with returns from numerous other locations including the ocean surface 4 and the ocean floor 5. These returns represent background clutter to the sonar receiver of the tracking submarine.

Figure 2:
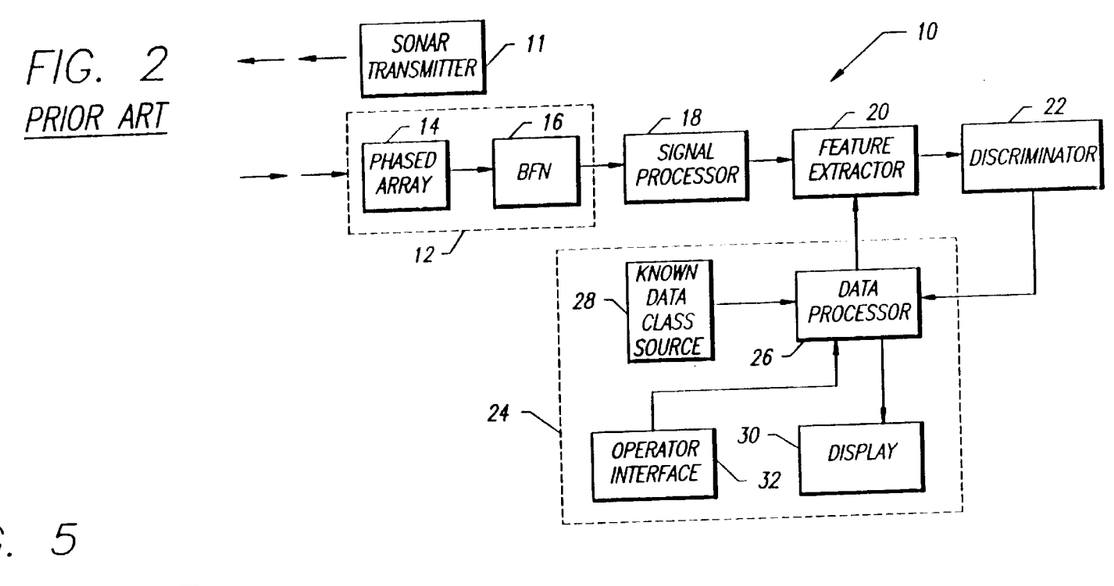
FIG. 2 is a block diagram of a sonar system equipped with a conventional pattern recognition system.

FIG. 2 is a block diagram of the sonar system 10' of The tracking submarine 1 equipped with a conventional pattern recognition system. The system 10' includes a sonar transmitter 11' and a sonar receiver 12'. The receiver 12' includes a phased array of sonar receiving elements 14' and a beamforming network 16' as is common in the art. The output of the beamforming network 16' is a signal corresponding to the generated beam. The signal is processed by a signal processor 18' to provide raw feature data. The signal processor 18' typically includes a bank of matched filters, detection and normalization circuits. A feature extractor 20' equipped with a classifier (not shown) operates on the raw feature data, identifies features (feature vectors) in the data samples and classifies the features in accordance with a feature boundary or surface in a multidimensional plane. The classified features are input to a discriminator 22' which endeavors to recognize patterns therein. The feature surface is provided initially in accordance with predetermined parameters. Thereafter, the feature surface is updated by the conventional classifier training system 24'. The conventional classifier training system 24' includes a data processor 26' which receives pattern data from the discriminator 22' and position data from the tracked submarine 2 (represented in the figure as a "KNOWN DATA CLASS SOURCE" 28') and displays representations of both on a display 30'.

In accordance with conventional teachings, an operator trains the classifier by examining the display and manually classifying data in and around the known class space. The classifier, thus trained, is then used to train the classifiers of other submarines.

Figure 3:
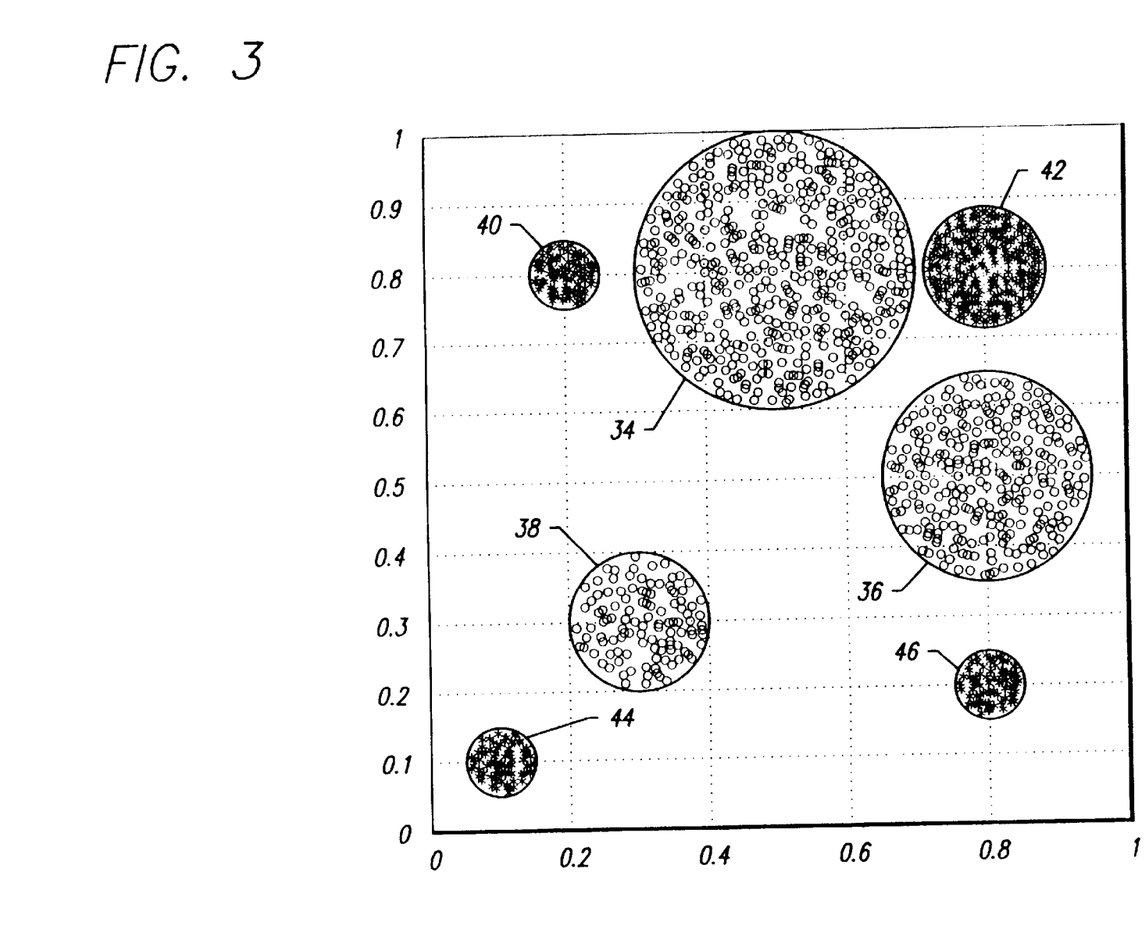
FIG. 3 is a diagram of input feature data useful in explaining the operation of a conventional classifier.

FIG. 3 is a diagram of input feature data useful in explaining the operation of a conventional classifier and a classifier. The two classes are '*' and 'o' where 'o' represents the class of known data. Both are distributed evenly uniformly randomly within the optimal and as yet unrecognized circle boundaries shown. There are 800 sample vectors from each class. The larger spheres 34, 36 and 38 represent the feature vectors from the known class and the smaller spheres 40, 42, 44 and 46 represent feature vectors from the unknown class. Given both classes, to facilitate pattern recognition, a boundary should be found that separates the classes.

Figure 4:
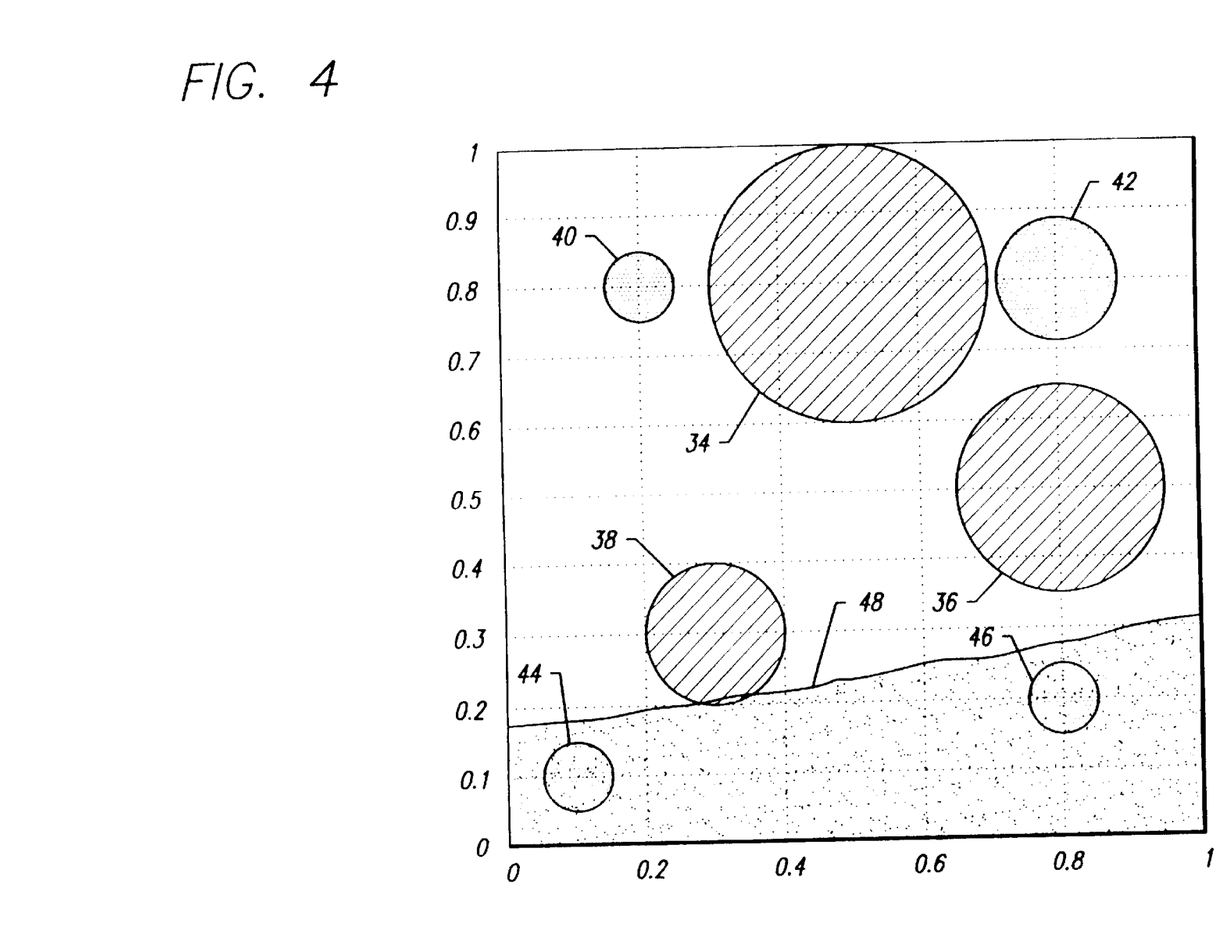
FIG. 4 is a diagram representative of boundary formation of a conventional classifier.

FIG. 4 is a diagram representative of boundary formation of the conventional classifier after 560,000 simulated presentations of the input feature data of FIG. 3 thereto. The samples below the boundary 48 were classified as being in a first class and samples above the boundary 48 were classified as being in a second class. It is evident that, in the simulation, the illustrative conventional classifier misclassified feature vectors in boundary spheres 40 and 42. In this example, this amounts to a 50% error classification rate.

In addition to a susceptibility for classification errors, this conventional classification training process is quite expensive inasmuch as it requires that data be generated from a known class, i.e., by the tasking and tracking of a second submarine, and the manual classification of feature vectors. Accordingly, it is particularly unfortunate that the data is typically nonstationary. As a result, the classifiers trained in accordance with the conventional technique are often grossly inaccurate after the passage of a relatively short period of time. Accordingly, there has been a need in the art for an automated technique for training classifiers for nonstationary data classes which is not limited by the need for more than one class of data.

This need is addressed by the present invention which provides an improved pattern recognition system which operates on a plurality of feature vectors from a single class of data samples. The inventive system estimates a pruning radius for the feature vectors in the single class of data samples and generates a replacement class therefrom based on the estimated pruning radius. This pruning radius is used to train a classifier which in turn facilitates the recognition of a data pattern in raw data. The pruning radius is adapted based on current results from the classifier.

Figure 5:
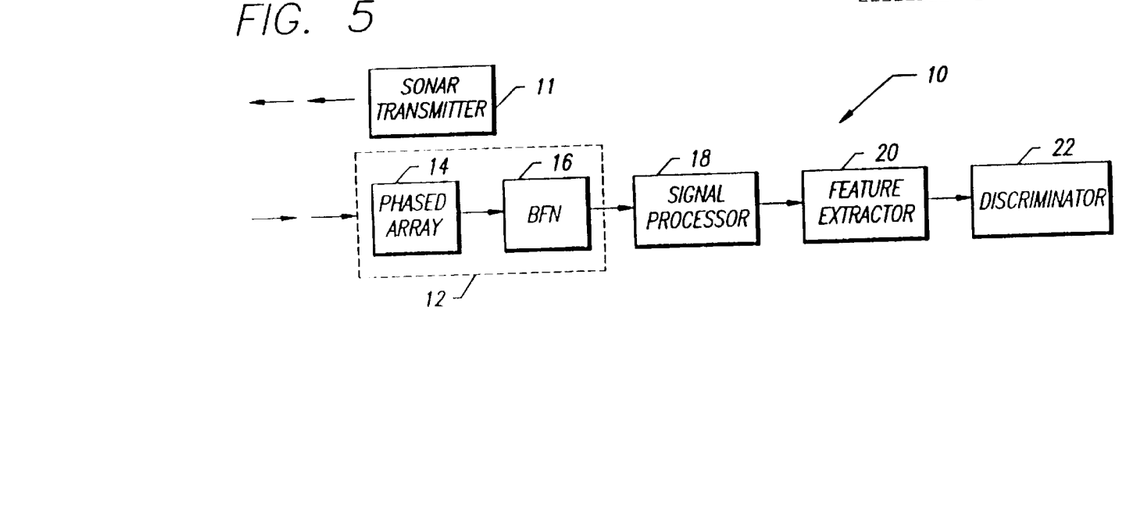
FIG. 5 is a block diagram of a sonar system having the improved pattern recognition system of the present invention.

FIG. 5 is a block diagram of a sonar system having the improved pattern recognition system of the present invention. As with the conventional system 10', the inventive system 10 includes a sonar transmitter 11, a sonar receiver 12, a signal processor 18, a feature extractor 20 and a discriminator 22. The inventive system differs, however, from the conventional system in that the classifier trainer 24' is eliminated along with the need for a source of a second class of known data and the need for operator intervention. The classifier trainer 24' of the conventional pattern recognition system 10' is eliminated by the use of the novel classifier training system of the present invention.

The inventive classifier consists of a binary classifier training method.

Figure 6A:
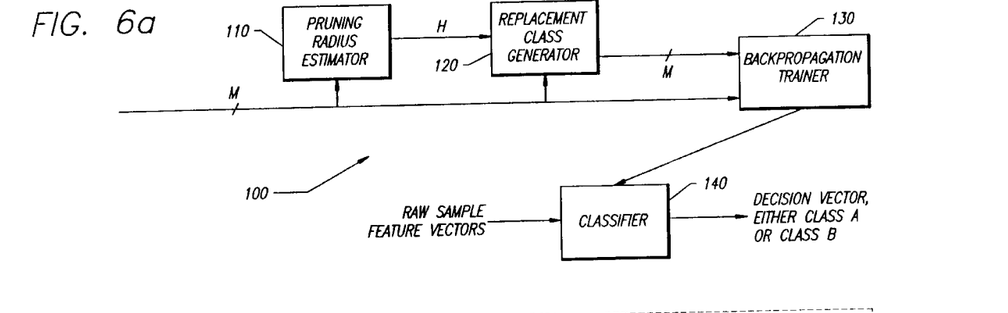
FIG. 6a is a block diagram of the classifier training system of the present invention in a training mode of operation to find classifier weights.

FIG. 6a is a block diagram of the classifier training system of the present invention in a training mode of operation to find classifier weights.

The novel classifier training system 100 includes a pruning radius estimator 110, a replacement class generator 120, a backpropagation trainer 130 and a classifier 140. FIG. 6a shows how the inventive classifier trains on a single class of features to find the classifier weights.

Figure 6B:
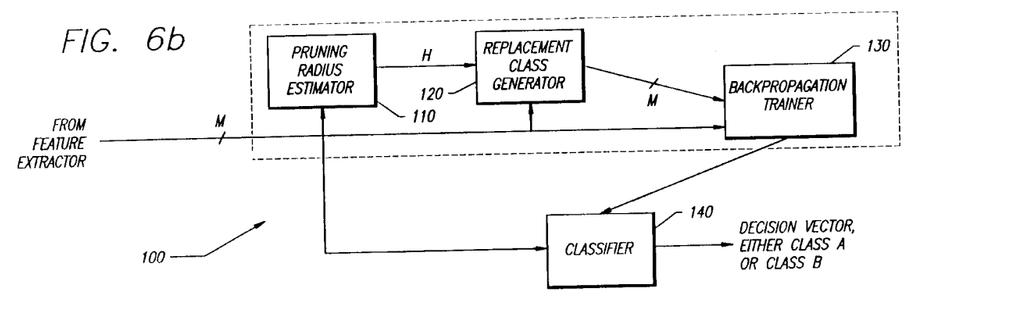
FIG. 6b is a block diagram of the classifier training system of the present invention in acting as an adaptive classifier in a long range active application.

FIG. 6b is a block diagram of the classifier training system of the present invention in acting as an adaptive classifier in a long range active application.

The method of operation of the classifier training system 100 is comprised of two main parts. The first part involves the selection of which of the two classes is easiest to obtain. The other class will then be represented by a replacement class. The replacement class will consist of random feature vectors which are drawn from a uniform distribution. Each element of the replacement class will consist of random feature vectors which are drawn from a uniform distribution. Each element of the replacement class vector is then a random variable, uniformly distributed over the range of possible values of that feature (e.g., feature n is the output of a photodetector which has maximum output magnitude 0.1 volt).

The second part involves modification of the completely random replacement class with the information contained in the known class. The modification consists of subtracting the space which contains the known class from the replacement class. The method for accomplishing this involves deleting all vectors drawn from the replacement class which are within a hypersphere of radius H of an known class sample.

The statistics of the process of deleting the replacement vectors falling in the known class space from the uniform replacement class are derived for this problem assuming uniform, independent known class statistics. This is done in terms of the hypersphere radius H. For real world applications, the uniform, independent assumption on the known class distribution may not be very accurate. Since the statistics have not been derived for a more realistic model (jointly Gaussian for example), a heuristic method for determining the distance H is as follows.

Figure 7A:
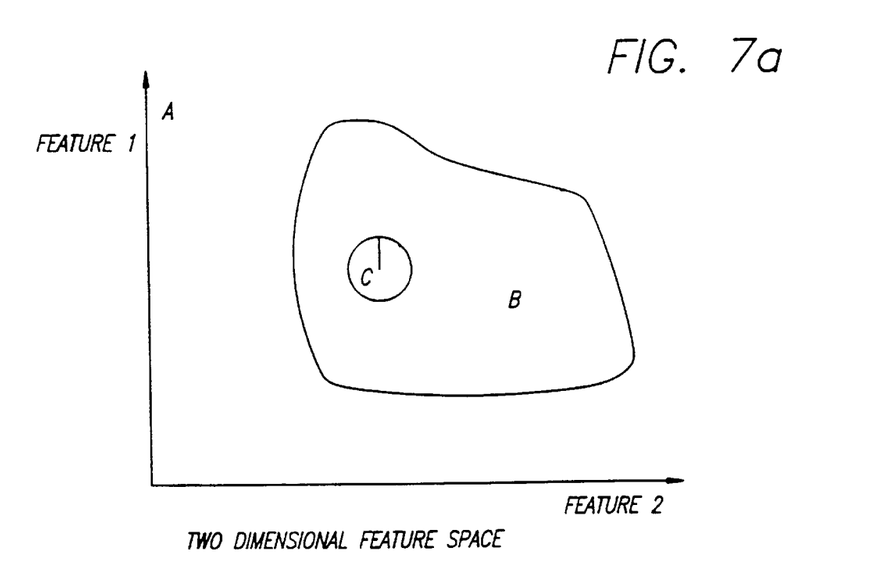
FIG. 7a is a diagram of a two dimensional feature space useful in the disclosure of the present teachings.

The pruning radius H is illustrated in FIG. 7a as the average distance between samples in the known class.

The pruning radius may be determined in accordance with either of two methods. The first method is a statistical technique which finds the radius H in terms of the probability of a replacement class sample occurring in the known class space. This technique makes strong assumptions about the type of class distributions and knowledge of it. The second technique makes no assumption about the underlying distributions but does not provide a nice relationship between the pruning radius and probability of a replacement class sample falling in the known class space. It does however hold some heuristic appeal. It should also be noted that there is a tradeoff in the radius H. If it is made too small, replacement class samples will remain in the known class space. If H is too large, the boundary that the classifier finds will not fit tightly about the known class space for the uniform case or for Gaussian like distributions, the boundary will favor the known class space.

The first method for determining the pruning radius H is as follows. First, the following assumptions are made: 1) the volume of the known class distribution is known or can be estimated and 2) distribution of the known class is uniform over its volume.

FIG. 7a is a diagram of a two dimensional feature space useful in the disclosure of the present teachings. The distributions A, B, and C are defined as having volumes $V_A$, $V_B$, and $V_C$, respectively. The point density $\lambda_A$, $\lambda_B$ and $\lambda_C$ are defined as equal to N/V where N is the number of sample points and V is the volume. Event C is defined as the placement of a hypersphere of volume $V_C$ arbitrarily within the space contained by $V_B$ and no sample points from distribution $V_B$ fall within $V_C$. From the uniform distribution assumption and the Poisson pdf The probability of event C is given as follows:

$$Pr\{\text{Event } C\} = e^{-\lambda_B V_C} \qquad [1]$$

Event L is defined as the placement of M hyperspheres of volume $V_C$ randomly inside of the space defining $V_B$. None of the spheres are empty. Performing a Bernoulli trial M times yields:

$$Pr\{\text{Event } L\} = |_O^M| Pr\{\text{Event } C\}^O (1 - Pr\{\text{Event } C\})^M \qquad [2]$$

With simplification, this becomes:

$$Pr\{\text{Event } L\} = (1 - e^{-\lambda_B V_C})^M \qquad [3]$$

The parameter M is the expected number of replacement distribution sample vectors falling within $V_B$. Thus, $M = \lambda_A V_B$.

Defining $Pr\{\text{Event } L\} = \alpha$, the volume of the hypersphere can be solved for in terms of the $\alpha$.

$$V_C = -\log(1 - e^{\log(\alpha)/(\lambda_A V_B)}) \qquad [4]$$

Thus, the pruning radius of the hypersphere for the two dimensional case is:

$$H = (-\log(1 - e^{\log(\alpha)/(\lambda_A V_B)})/\lambda_B \pi)^{1/2} \qquad [5]$$

This suggests that $\alpha$ should be set to some high probability (i.e., 90%) to insure that we prune all the samples of the replacement distribution from the volume of distribution A.

If either assumption for the first method is not met (i.e., the second assumption is most likely to be invalid for real world data), then another method for determining the pruning radius must be employed. The second method for determining the pruning radius makes no assumptions about the underlying distributions and provides no direct relation between the pruning radius H and the probability of missing a replacement class sample within a known class distribution. Hence, the second method of determining the pruning radius is as follows.

First, let $\underline{V}_k$ represent the kth feature vector of known distribution. There are N feature vectors in the known sample distribution. The nearest neighbor distance:

$$d_k = \min[\|\underline{V}_k - \underline{V}_L\|] \qquad [6]$$

for L=1 to M, except for L=k. The sample average of nearest neighbor distance:

$$D = (1/M) \sum_{k=1}^{M} d_k \qquad [7]$$

Sample variance of the nearest neighbor distance:

$$\sigma_D = ((1/(M-1))) \sum_{k=1}^{M} (d_k - D^2)^{1/2} \qquad [8]$$

Figure 7B:
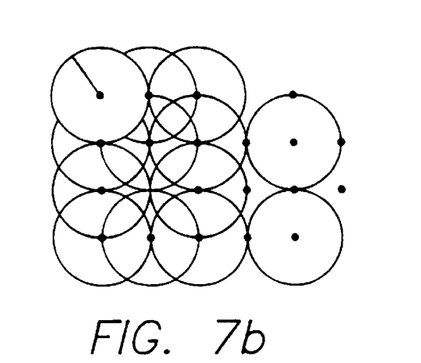
FIG. 7b is a diagram of a two dimensional feature space where the pruning radius and average nearest neighbor distance are equal because the variance is zero.
Figure 7C:
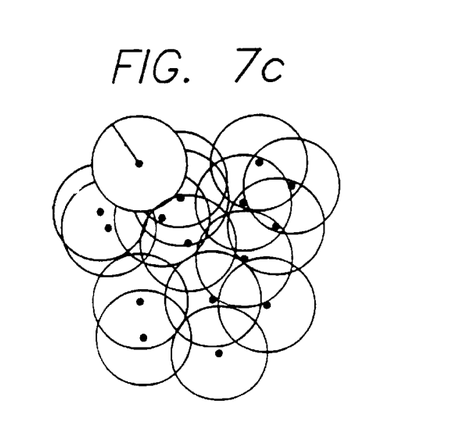
FIG. 7c is a diagram of a two dimensional feature space where the pruning radius is equal to the average nearest neighbor distance plus a standard deviation.

For illustration, assume H=D and the feature space is two dimensional. Assume further that the known distribution samples are spaced at grid points as shown in FIGS. 7b and 7c. FIG. 7b is a diagram of a two dimensional feature space where the pruning radius and average nearest neighbor distance are equal because the variance $\sigma_D$ is zero. In this case, there is no area left uncovered by the circles placed around the known sample points. The circles actually drawn are only illustrative. If every circle were drawn about every point in the mesh all the points would be overlapped by at least 2 circles. For a random distribution of known sample points, the variance will be some positive number. Conceptually, the higher the variance, the larger the pruning radius should be. To accomplish this, the pruning radius H may be set equal to $D + \sigma_D$ as depicted in FIG. 7c. FIG. 7c is a diagram of a two dimensional feature space where the pruning radius is equal to the average nearest neighbor distance plus D the standard deviation $\sigma_D$.

Returning to FIG. 6a, after the pruning radius is determined, the replacement class generator 120 uses the pruning radius to generate a replacement class. The replacement class is uniformly distributed over the feature space with the known class space removed. The method for generating the uniform replacement class and subtracting out the known class space is as follows. First, a uniform N-dimensional replacement class is generated. This can be accomplished with a uniform random number generator. The random number generator would provide independent samples for each feature distributed over the possible range of each feature. Once this is accomplished, those replacement class sample vectors falling in the known class space must be removed. This is accomplished by deleting all samples from the replacement class that fall within the pruning radius H for each sample vector in the known class.

In the illustrative embodiment, the pruning radius estimator 110 and the replacement class generator 120 may be implemented in software. The following is a MATLAB M-file (code) for finding the pruning radius and the replacement class:

Illustrative Replacement Class and Pruning Radius Code

```
function y = get_radius(clut);
%
% Gets the nearest neighbor distance between feature
% vectors in x. x is N by M dimensional where
% is the number of features.
%
[lenx, wx] = size (clut)
for k = 1:lenx
    i = 1;
        for 1 = [1:(k-1),(k+1):lenx]
            diff = clut(k,:)-clult(1,:);
            d(i) = diff*diff;
            i=i+1;
            end; % for
        dis(k) = min(d);
        if (rem(k,10)=0),k,end;
        end; % for
y = dis.^(1/2);
function y = cut_target(clut, num_targ,radius);
%
% For each clutter point if any target point is within
% some distance L it is deleted from the input. The
% targets are defined to be uniformly distributed over
% the feature space.
%
% clut - clutter points
% num_targ - number of targets to produce
% radius - pruning radius for hypersphere
%
rand('uniform')
rand('seed', 1042345324);
num_vec = min(size(clut));
targets = [];
while length(targets) < num_targ;
    t_targ = rand(round(num_targ/10), num_vec);
    for k = 1:length(clut)
        for 1 = 1:length(t_targ)
            d1 = clut(k,:)-t_targ(1,1) = -inf; end;
            if d1*d1'< (radius^2);t_targ(1,1)=-inf; end;
            end; % for
        end; % for
    targets=[targets; t_targ(find(t_targ(:,1)~=-inf),:)];
    end; % while
y = targets;
```

After the two classes (the known class and the replacement class) are found, a classifier must be used to find a boundary between the two distributions. The only requirement on the classifier is that it be sufficiently sophisticated to be able to enclose the known distribution.

An illustrative implementation of the artificial neural network classifier 140 of the present invention is as follows.

The classifier is implemented in software using conventional techniques. The classifier 140 includes an input layer, which does no processing, and three layers of nodes, the final layer of nodes is referred to as the output layer. There are two inputs (one for each feature), then five nodes in the next layer, ten in the next and two nodes in the output layer. The system equations are:

$$^{k}U = {}^{k}w^{k}a \qquad [9]$$

and $$^{(k+1)}a = f(^{k}U) 1 \leq k \leq M \qquad [10]$$

where:

$^{k}w$ is $^{(1+k)}N$ by $^{k}N$ weight matrix where $^{i}N$ is the number of nodes at layer i; so $^{1}N$ is the number of input features and $^{M}N$ is the number of outputs;

$^{i}U$ is the output column vector of layer i; and $^{i}a$ is the activation value column vector which is the input to layer i; so $^{i}a$ is the input feature vector and $^{1+M}a$ is the output of the network.

Equation [10] does not provide a specific function. In the illustrative embodiment, this function is the Sigmoid function.

The classifier 140 is trained by presenting a feature vector at the input, propagating the input through the network and comparing it to a known output. The error (the difference between the known output and the propagated input is then used to modify the network weights in a manner which lessens the error. This function is performed in the illustrative embodiment by the backpropagation trainer 130 of FIGS. 6a and 6b. Those skilled in the art will appreciate that other classifier training schemes without departing from the scope of the present teachings. The backpropagation trainer 130 of the illustrative system may be implemented in software to perform the following operations.

$$^{i}w(n+1) = {}^{k}w(n) - \eta \delta E/\delta^{k}w \qquad [11]$$

$$E = (^{(M+1)}a-t)^2 \qquad [12]$$

where η is a learning coefficient and t is a target value vector.

Implementation:

$$^{k}w(N+1) = {}^{k}w(n) - {}^{k}\Delta w(n) \qquad [13]$$

$$^{k}\Delta w(n) = \eta \beta \cdot {}^{(k+1)}a(n) \qquad [14]$$

(Some implementations include a "momentum" term which add $\alpha \Delta w(n-1)$ to equation [14].

$$\beta = {}^{(k+1)}a(n) \cdot (1 - {}^{(k+1)}a(n)) \cdot {}^{k}\phi \qquad [15]$$

$$^{M}\phi = ({}^{(M+1)}a(n) - t(n)) \qquad [16]$$

$$^{i-1}\phi = {}^{i}\phi^{i}w' \qquad [17]$$

where $2 \leq i \leq M-1$.

FIG. 6b, depicts the operation of the classifier training system of the present invention in a long range active sonar processing environment as an adaptive classifier. In this mode, the class A sample feature vector input shown in FIG. 6a is replaced by raw sample feature vectors from the feature extractor 20 of FIG. 5. The raw sample feature vectors are used to adapt the pruning radius. Thus, the pruning radius estimator tightens a statistical mesh about the known class as it learns more about the environment. Thereafter, the replacement class generator defines a boundary between the known and unknown classes with the replacement class.

The classifier weights are trained on data from time interval [t−Δτ, t] and decisions are made about raw data sample vectors at time intervals [>t]. The choice of Δτ is driven by two conflicting requirements. It must be smaller than the stationary time of the random process from which the feature vectors are samples and it must be large enough to provide a good estimate of the clutter feature space. The only assumption concerning the input data is that the ratio of clutter to target feature samples is large enough not to bias the estimate of the clutter space. This is a good assumption for long range active sonar.

Figure 8:
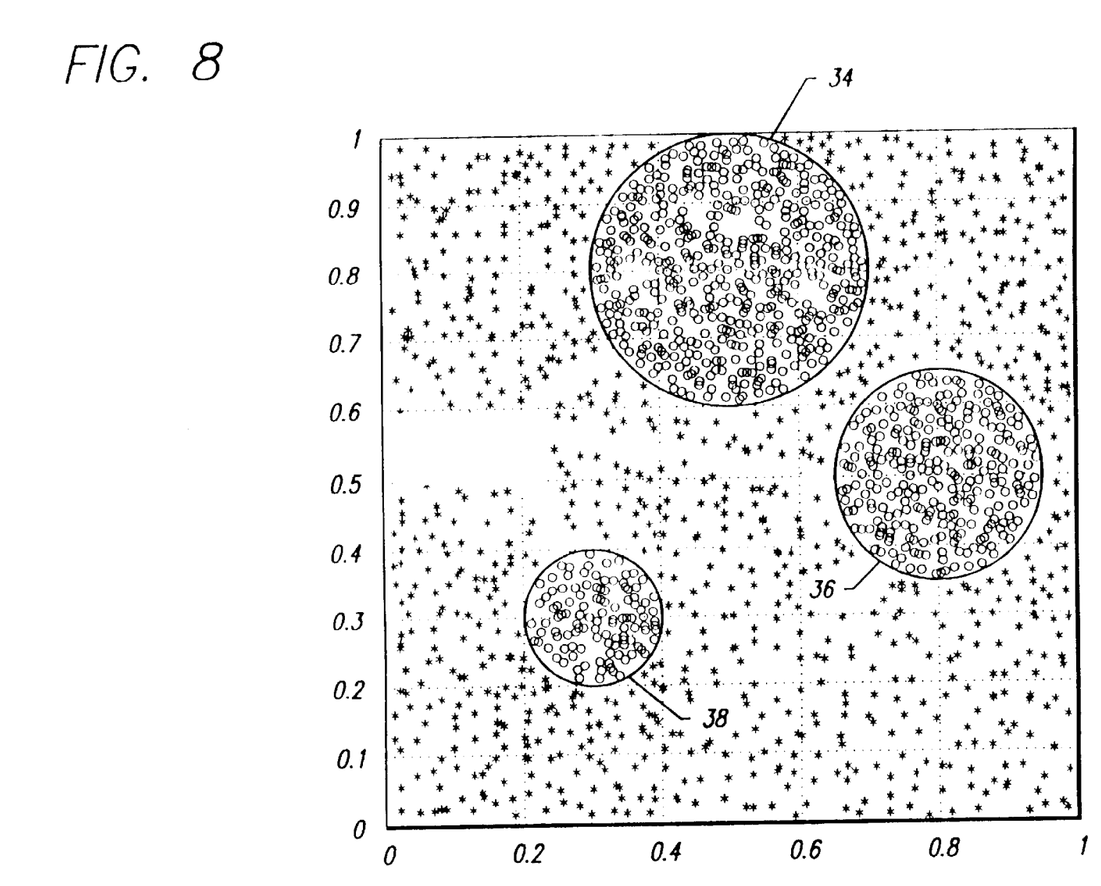
FIG. 8 is a diagram of input feature data useful in explaining the advantageous operation of the present invention.
Figure 9:
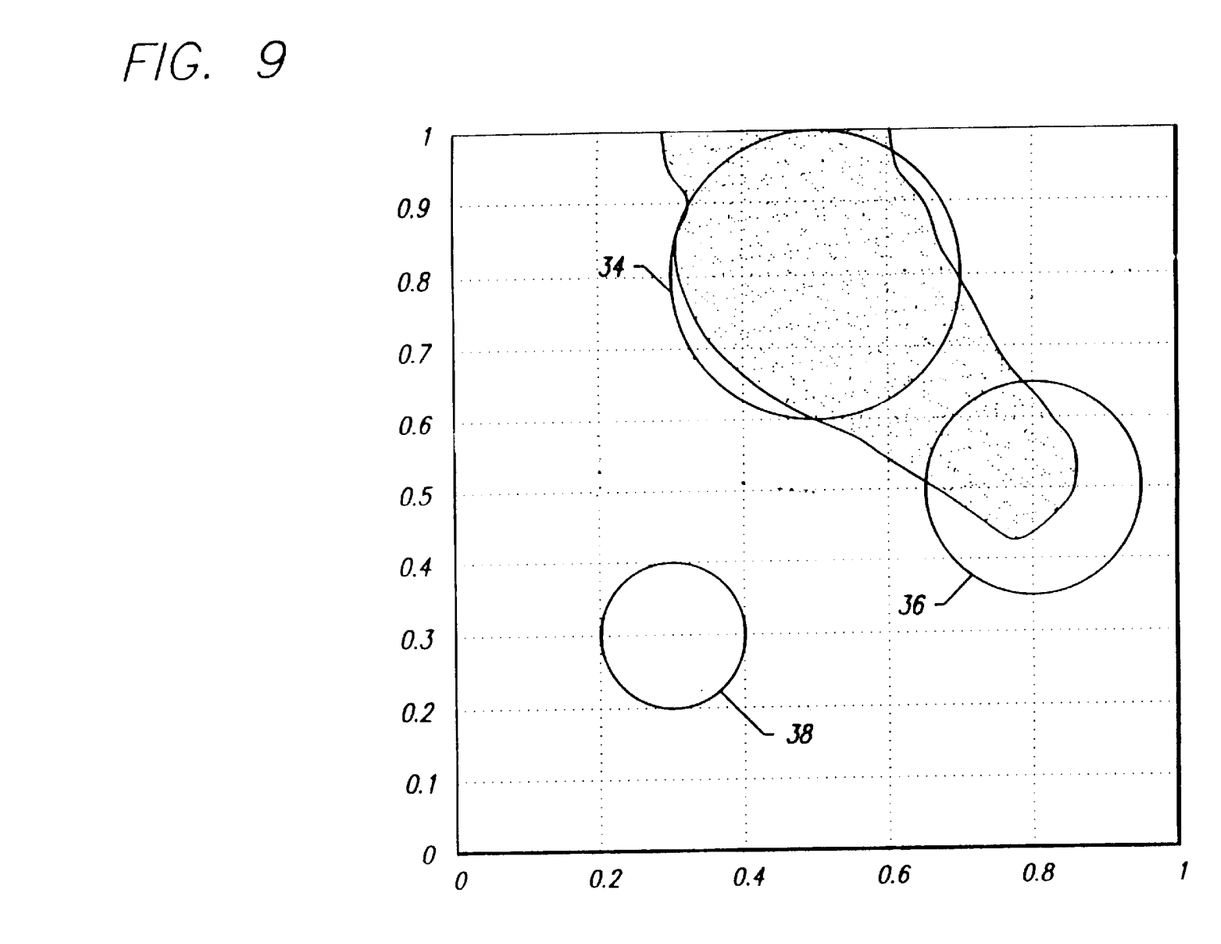
FIG. 9 is a diagram of feature data after a first number of random presentations of input data to the classifier of the present invention.
Figure 10:
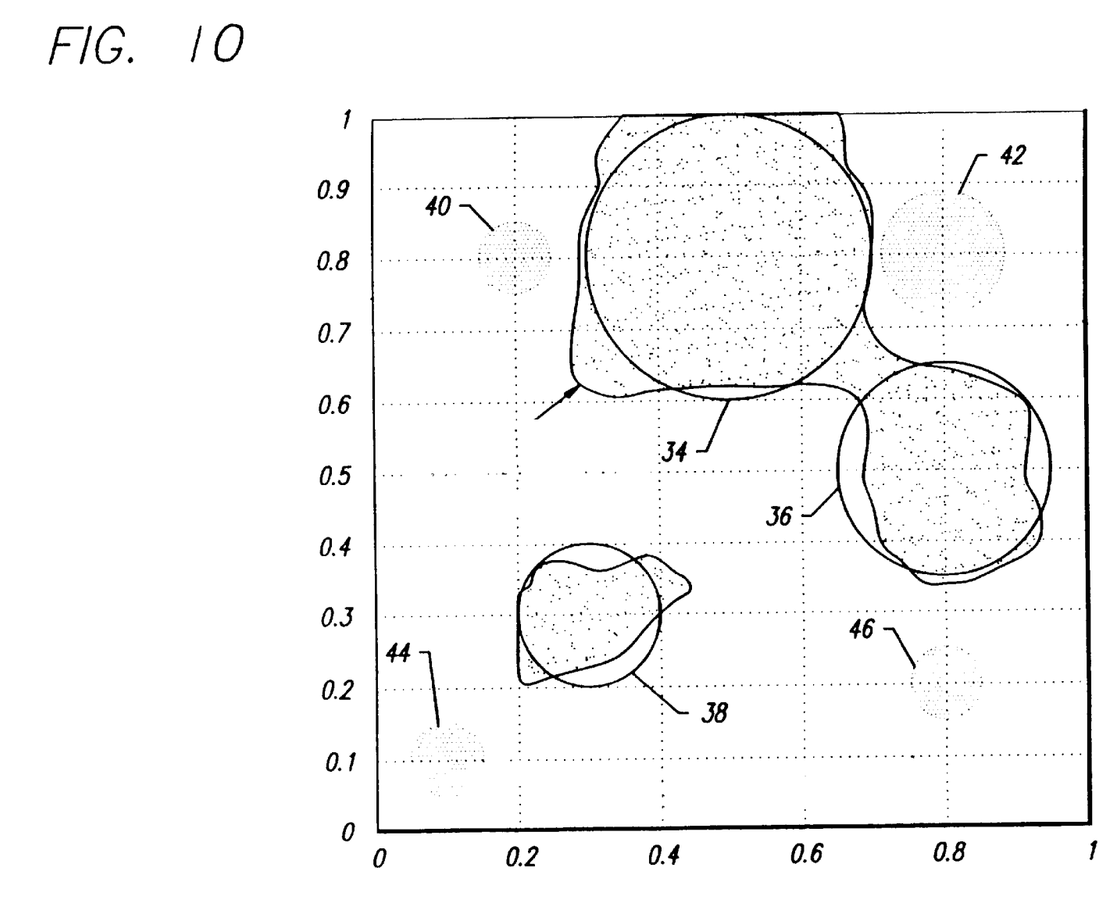
FIG. 10 is a diagram of feature data after a second number of random presentations of input data to the classifier of the present invention.

FIGS. 8–10 illustrate the advantageous operation of the present invention.

FIG. 8 is a diagram of input feature data useful in explaining the advantageous operation of the present invention. The figure corresponds to FIG. 3 in that it depicts a target in a background. Two dimensional input sample vectors are depicted for both the known class 'o', and the replacement class '*'. Note that unlike FIG. 3, data is presented with respect to one known class only, not two as required by classifier training systems of conventional teachings. In FIG. 8, the known class is evenly distributed within the circle boundaries.

FIGS. 9 and 10 are diagrams of feature data after 160,000 iterations and 560,000 iterations, respectively. That is, after 160,000 and 560,000 random presentations of input data to the system of the present invention with M=4, η=0.9, and α=0.1 and initial values for the layer weights being outcomes of a pseudo-random number generator evenly distributed between +/−0.1. The fine line is the decision boundary produced after the iterations and the bold line is the optimal boundary. The replacement class was generated from knowledge of the 'o' class samples used the second method for determining the pruning radius described above. These simulation results show that without any knowledge of the target distribution, a boundary is learned that classifies with near perfect accuracy.

Thus, it can be seen that the present invention provides an improved pattern recognition system which operates on a plurality of feature vectors from a single class of data samples. The inventive system estimates a pruning radius for the feature vectors in the single class of data samples and generates a replacement class therefrom based on the estimated pruning radius. This pruning radius is used to train a classifier which in turn facilitates the recognition of a data pattern in raw data. The pruning radius is adapted based on current results from the classifier.

Thus, the present invention has been described herein with reference to a particular embodiment for a particular application. Those having ordinary skill in the art and access to the present teachings will recognize additional modifications applications and embodiments within the scope thereof. For example, the invention is not limited to sonar applications. Nor is the invention limited to a particular classifier or a particular classifier training technique. In addition, the invention is not limited to the technique illustrated for defining a pruning radius or a replacement class. other systems and techniques for defining these parameters may be used without departing from the scope of the invention.

It is therefore intended by the appended claims to cover any and all such applications, modifications and embodiments within the scope of the present invention.

Accordingly,

What is claimed is:

1. An improved pattern recognition system for a sonar system, said pattern recognition system for discriminating a target from background clutter, including:

transmitter means for providing a sonar pulse directed towards said target;

phased array beam forming network means for receiving said returned sonar pulse and providing a received signal;

signal processing means for detecting said received signal and extracting a plurality of said data samples therefrom;

means for extracting features in said data samples including;

first means for generating a plurality of feature vectors from a single non-stationary class of data samples, said data samples consisting of background clutter data;

second means for estimating a pruning radius for said feature vectors in said single non-stationary class of data samples;

third means for generating a replacement class of data samples from said single non-stationary class of data samples based on said pruning radius, said replacement class of data samples further comprising random feature vectors selected from a uniform distribution;

fourth means for classifying raw data to facilitate the recognition of a pattern therein, said fourth means including classifier weights; and fifth means for training said fourth means based on said pruning radius, and said replacement class of data samples said fifth means comprising means for determining said classifier weights;

means for recognizing patterns in said raw data based on the output of said fourth means; and means for adapting said estimated pruning radius and said classifier weights based on current results from said fourth means.

2. An improved pattern recognition system comprising:

first means for generating a plurality of feature vectors from a single class of non-stationary data samples;

second means for estimating a pruning radius for said feature vectors in said single class of non-stationary data samples;

third means for generating a replacement class of data samples from said single class of data samples based on said pruning radius, said third means including means for generating a uniform distribution of random replacement vector elements occupying a class space for said replacement class of data samples wherein said vector elements are selected from a uniform distribution, and means for deleting from said uniform distribution of random replacement vector elements all vector elements which are within a hypersphere of said pruning radius of a feature vector to provide said replacement class;

fourth means for classifying raw data to facilitate the recognition of a pattern therein, said fourth means including a plurality of classifier weights;

fifth means for automatically training said fourth means based on said pruning radius and said replacement class of data samples, said fifth means including means for determining said classifier weights;

sixth means for adapting said estimated pruning radius and said classifier weights based on current results from said fourth means.

3. An improved method for recognizing a pattern in data samples including the steps of:

generating a plurality of sample feature vectors within a class space from a single non-stationary class of said data samples;

estimating a pruning radius for said feature vectors in said single class of data samples;

generating a replacement class from said single class of data samples based on said pruning radius, including generating a uniform distribution of random replacement vector elements occupying said class space and deleting from said uniform distribution all random vector elements which are within a hypersphere of said pruning radius of a sample feature vector to provide said replacement class;

training a classifier based on said replacement class by determining classifier weights;

classifying raw data in said single non-stationary class or a second class based on said training to facilitate the recognition of a pattern therein;

adapting said estimated pruning radius and said classifier weights based on current results from said step of classifying raw data.

4. A long range sonar system having an improved pattern recognition capability for discriminating target data from background data, incorporating an automated technique for training classifiers for non-stationary data classes comprising:

transmitter means for providing a sonar pulse;

phased array beam forming network means for receiving said sonar pulse to provide a received signal;

signal processing means for detecting said received signal and extracting a plurality of data samples therefrom;

means for extracting feature vectors from said data samples and discrimination means for discriminating target data from background data, comprising:

classifier means responsive to raw data sample random feature vectors, said random feature vectors selected from a uniform distribution of said raw data sample during a sonar operating mode for discriminating target data from background data, wherein said background data further comprises a single class of non-stationary clutter data, said classifier means employing classifier network weights in said discrimination; and classifier training means operable in a training mode for training said classifier to determine said classifier weights, wherein said classifier is trained without the need for target data said training means comprising first means for generating a plurality of random sample feature vectors from a single class of background data samples, second means for estimating a pruning radius for said random sample feature vectors in said single class of background data samples, third means for generating a replacement class of random sample feature vectors from said plurality of random sample feature vectors from said single class of data samples based on said pruning radius, wherein said means for generating said replacement class further comprises means for generating an initial replacement class whose elements consist of random feature vectors which are selected from a uniform distribution, and means for deleting from said initial replacement class all vectors selected from the initial replacement class which are within said pruning radius of a sample feature vector, means for propagating a sample feature vector through said classifier to obtain a resulting classifier output, and back-propagation training means responsive to said sample feature vector and said replacement class feature vectors for modifying said classifier weights in response to differences between a known classifier output and said resulting classifier output; and means for adapting said classifier weights in response to raw sample feature vectors extracted by said extracting means of data samples comprising background and target data.

5. A long range sonar system having an improved pattern recognition capability for discriminating target data from background data, wherein said background data is a class of non-stationary clutter data, comprising:

transmitter means for providing a sonar pulse toward a target;

phased array beam forming network means for receiving said returned sonar pulse to provide a received signal;

signal processing means for detecting said received signal and extracting a plurality of data samples therefrom;

means for extracting feature vectors from said data samples; and discrimination means for discriminating target data from background data, comprising:

classifier means responsive to raw data sample feature vectors during a sonar operating time interval for discriminating target data from non-stationary background data, said classifier means employing classifier network weights in said discrimination; and an automatic classifier training means operable in a training mode during a training time interval prior to said sonar operating time interval for training said classifier to adapt said classifier weights to raw sample feature vectors received during said training time interval and comprising target and background data, said training means comprising first means for estimating a pruning radius for said raw sample feature vectors received during said training time interval, second means for generating a replacement class of random feature vectors, said second means comprising means for generating an initial replacement class whose elements consist of random feature vectors which are selected from a uniform distribution, and means for deleting from said initial replacement class all vectors selected from the initial replacement class which are within said pruning radius of a raw sample feature vector, means for propagating a raw data sample feature vector through said classifier to obtain a resulting classifier output, and back-propagation training means responsive to said raw sample feature vector and said replacement class feature vectors for modifying said classifier weights in response to differences between a known classifier output and said resulting classifier output.

6. A method for discriminating target data from background data in a sonar system, wherein said background data is a class of non-stationary clutter data, comprising the steps of:

transmitting a sonar pulse;

receiving said sonar pulse to provide a received signal;

detecting said received signal and extracting a plurality of data samples therefrom;

extracting feature vectors from said data samples; and processing said feature vectors to discriminate target data from background data, said processing including the following steps:

classifying raw data sample feature vectors as target or background feature vectors during a sonar operating time interval by use of classifier network weights; and determining said classifier weights during a training mode by generating a plurality of sample feature vectors from a single class of background data samples wherein said classifier is trained without the need for target data, estimating a pruning radius for said sample feature vectors in said single class of background data samples, generating a replacement class of random feature vectors based on said pruning radius, said random feature vectors drawn from a uniform distribution, propagating a sample feature vector through said classifier to obtain a resulting classifier output, and modifying said classifier weights in response to differences between a known classifier output and said resulting classifier output.

* * * * *